(12) United States Patent
Iordache et al.

(10) Patent No.: US 9,903,999 B2
(45) Date of Patent: Feb. 27, 2018

(54) LIGHT ASSEMBLY FOR ILLUMINATING AN EMBLEM

(71) Applicant: Tyco Electronics Canada ULC, Markham (CA)

(72) Inventors: Lucian Iordache, Woodbridge (CA); Nelson Yu, Thornhill (CA)

(73) Assignee: TYCO ELECTRONICS CANADA ULC, Berwyn, PA (US)

( * ) Notice: Subject to any disclaimer, the term of this patent is extended or adjusted under 35 U.S.C. 154(b) by 85 days.

(21) Appl. No.: 15/004,019

(22) Filed: Jan. 22, 2016

(65) Prior Publication Data

US 2016/0231493 A1 Aug. 11, 2016

Related U.S. Application Data

(60) Provisional application No. 62/114,724, filed on Feb. 11, 2015.

(51) Int. Cl.
| | | |
|---|---|---|
| *G01D 11/28* | (2006.01) |
| *F21V 8/00* | (2006.01) |
| *G09F 13/18* | (2006.01) |
| *G09F 21/04* | (2006.01) |
| *B60R 13/00* | (2006.01) |
| *G09F 13/22* | (2006.01) |

(52) U.S. Cl.
CPC ............ *G02B 6/006* (2013.01); *B60R 13/005* (2013.01); *G02B 6/009* (2013.01); *G02B 6/0043* (2013.01); *G02B 6/0055* (2013.01); *G09F 13/18* (2013.01); *G09F 21/04* (2013.01); *G09F 2013/222* (2013.01)

(58) Field of Classification Search
CPC .............. F01P 11/16; F01P 11/14; B60Q 1/26

USPC ...................................................... 362/23.14
See application file for complete search history.

(56) References Cited

U.S. PATENT DOCUMENTS

| | | |
|---|---|---|
| 6,190,026 B1 | 2/2001 | Moore |
| 7,866,858 B2 | 1/2011 | Hirzmann |
| 8,303,147 B2 | 11/2012 | Jeon |
| 8,449,161 B2 | 5/2013 | Igoe et al. |
| 8,752,989 B2 | 6/2014 | Roberts et al. |

(Continued)

FOREIGN PATENT DOCUMENTS

| | | | |
|---|---|---|---|
| JP | 2006 044330 A | 2/2006 |
| JP | 2006 160136 A | 6/2006 |

(Continued)

OTHER PUBLICATIONS

International Search Report, International Application No. PCT/US2016/016290, International Filing Date, Feb. 3, 2016.

*Primary Examiner* — Ahshik Kim (57) ABSTRACT

A light assembly for illuminating an emblem includes a housing, an emblem, and an optical light guide. The housing holds a light source. The emblem has a structural body defined by emblem edges. The optical light guide is coupled to the housing and has a shape associated with the emblem. A surface of the optical light guide faces and is at least partially covered by the structural body of the emblem. The optical light guide defines exposed edges that project laterally beyond the emblem edges of the emblem. The optical light guide is configured to receive light generated by the light source and to emit at least some of the light along the exposed edges thereof.

20 Claims, 5 Drawing Sheets

(56) References Cited

U.S. PATENT DOCUMENTS

| | | | |
|---|---|---|---|
| 8,925,959 B2 | 1/2015 | Bosch et al. | |
| 2010/0102538 A1* | 4/2010 | Paxton | B60Q 3/283 |
| | | | 280/728.3 |
| 2010/0186214 A1* | 7/2010 | Judge | B60Q 1/2696 |
| | | | 29/445 |
| 2014/0247614 A1* | 9/2014 | Roberts | B60Q 1/2615 |
| | | | 362/509 |
| 2014/0307476 A1* | 10/2014 | Calderas | G02B 6/0076 |
| | | | 362/616 |

FOREIGN PATENT DOCUMENTS

| | | |
|---|---|---|
| JP | 2009 012558 A | 1/2009 |
| JP | 2011 063169 A | 3/2011 |
| WO | 2014/136598 A1 | 9/2014 |

\* cited by examiner

LIGHT ASSEMBLY FOR ILLUMINATING AN EMBLEM

CROSS-REFERENCE TO RELATED APPLICATIONS

This application claims priority to U.S. Provisional Application No. 62/114,724, filed 11 Feb. 2015, which is incorporated by reference in its entirety.

BACKGROUND OF THE INVENTION

The subject matter herein relates generally to light assemblies for illuminating an emblem.

Illuminated emblems, logos, and other indicia provide a visual effect that highlights the specific features of the indicia and draws an observer's attention to the indicia. Illustrated emblems and other indicia may be used in the automotive industry to illuminate specific indicia of an automobile in dark conditions, such as when driving at night.

Some light assemblies for illuminating an emblem are configured to emit light around a perimeter of the emblem and/or along interior edges of the emblem in order for the light to border or trace an outline of the emblem. However, in order to provide light along such edges, many light sources may be used. The light sources may be positioned next to each other along the path to be illuminated, such that the light sources themselves trace the outline of the emblem. For example, some light assemblies include over one hundred different light sources. Using a large number of light sources causes issues with physical spacing in the light assembly, power requirements, thermal effects, financial expense for parts and assembly, and the like. For example, installing many light sources next to each other in a small space generates significant heat, even if the light sources are light emitting diodes (LEDs) or other relatively low-heat-emitting lights. The heat directly affects the life of the light sources as well, as a high temperature environment may cause the light sources to prematurely burn out.

A need remains for illuminating an emblem using only one or a few light sources.

BRIEF DESCRIPTION OF THE INVENTION

In one embodiment, a light assembly for illuminating an emblem is provided that includes a housing, an emblem, and an optical light guide. The housing holds at least one light source configured to generate light. The emblem has a structural body defined by emblem edges. The optical light guide is coupled to the housing and has a shape associated with the emblem. The optical light guide has a surface facing and at least partially covered by the structural body of the emblem. The optical light guide defines exposed edges that project laterally beyond the emblem edges of the emblem. The optical light guide is configured to receive light generated by the at least one light source and to emit at least some of the light along the exposed edges thereof.

In another embodiment, a light assembly for illuminating an emblem is provided that includes an emblem and an optical light guide. The emblem has a structural body defined by emblem edges. The optical light guide is coupled to the emblem. The optical light guide is configured to receive light generated by at least one light source and to transmit the light through the optical light guide. The optical light guide has a shape associated with the emblem. The optical light guide has a front surface facing and at least partially covered by the structural body of the emblem. The optical light guide defines exposed edges that project laterally beyond the emblem edges of the emblem. An exposed region of the optical light guide is defined between the exposed edges and the emblem edges of the emblem. The optical light guide has light scattering elements located along the exposed region. The light scattering elements are configured to reflect at least some of the light being transmitted through the optical light guide to emit light from the optical light guide along the exposed region and illuminate the emblem edges of the emblem.

DETAILED DESCRIPTION OF THE INVENTION

Figure 1:
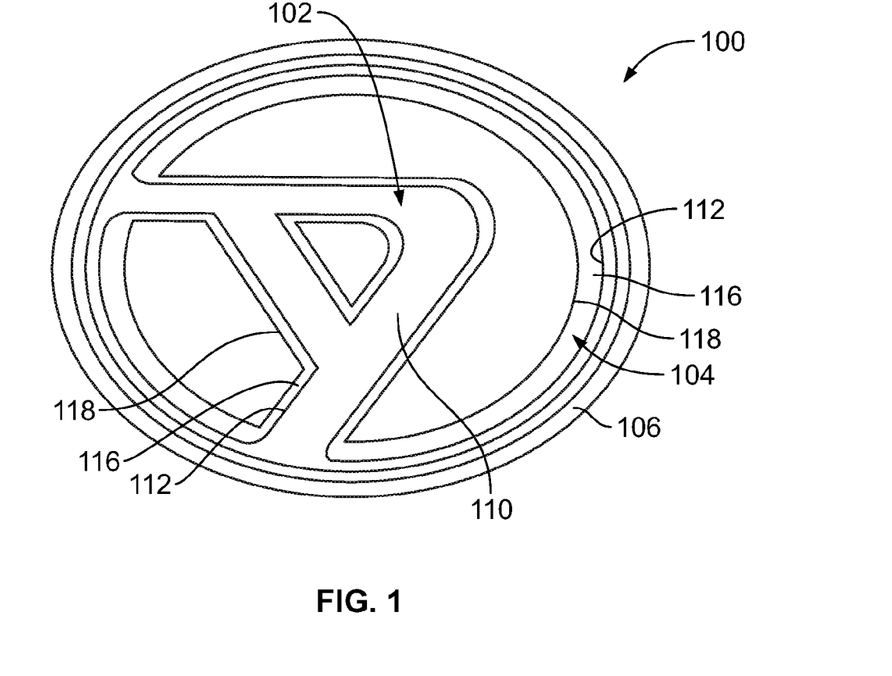
FIG. 1 is a front view of a light assembly for illuminating an emblem that is formed in accordance with one embodiment.

FIG. 1 is a front view of a light assembly 100 for illuminating an emblem that is formed in accordance with one embodiment. The light assembly 100 includes an emblem 102. The emblem 102 may represent a logo, an emblem, a sign, a symbol, or another type of indicia. In an example embodiment, the emblem 102 may represent an emblem of an automobile manufacturer. The light assembly 100 is configured to illuminate the emblem 102, such that the contours of the emblem 102 are highlighted and visible in dark lighting conditions, such as at night. The light assembly 100 may allow the emblem 102 to be easily identified in the dark. The illumination of the emblem 102 also may provide an aesthetically pleasing lighting effect to observers.

The emblem 102 has a structural body 110 that is defined by emblem edges 112. The structural body 110 is in the shape of the emblem 102, such that the emblem edges 112 of the structural body 110 form the contours and perimeter of the emblem 102. In addition to the emblem 102, the light assembly 100 also includes an optical light guide 104 and a housing 106 that holds at least one light source 108 (shown in FIG. 3) configured to generate light. The emblem 102 extends from the housing 106. For example, the emblem 102 may be formed integral with the housing 106 as a unitary structure, or the emblem 102 may be removably coupled to the housing 106. The optical light guide 104 is removably coupled to the housing 106.

The optical light guide 104 has a light transmissive interior region 114 (shown in FIG. 5), such that light can be received in, can be transmitted through, and can be emitted from the optical light guide 104. The optical light guide 104 is configured to receive light generated by the at least one light source 108 and to transmit the light through the interior region 114 via internal reflection. The optical light guide 104 is configured to emit the light transmitted through the interior region 114 at select locations and in select directions in order to illuminate the emblem 102. The optical light guide 104 may be referred to herein as light guide 104.

In an embodiment, the light guide 104 has a shape associated with the emblem 102. The light guide 104 has a surface 116 that faces, and is at least partially covered by, the structural body 110 of the emblem 102. The light guide 104 defines exposed edges 118 that project laterally beyond the emblem edges 112 of the emblem 102. The exposed edges 118 are edges of the light guide 104 that are not covered by the structural body 110 of the emblem 102, and are thus exposed. The exposed edges 118 are visible to an observer when viewing the light assembly 100 from the front, as shown in FIG. 1.

In an embodiment, the light guide 104 has light scattering elements 120 (shown in FIG. 5) that are proximate to at least portions of the exposed edges 118 of the light guide 104. The light scattering elements 120 are configured to deflect at least some of the light being transmitted through the interior region 114 (shown in FIG. 5) such that light is emitted from the light guide 104 proximate to the exposed edges 118 thereof. For example, the light scattering elements 120 deflect the light in various directions, and at least some of the deflected light is emitted through the surface 116 of the light guide 104 that faces the emblem 102. The light may be emitted through the surface 116 proximate to the exposed edges 118 such that the emitted light illuminates the emblem edges 112 of the emblem 102.

Figure 2:
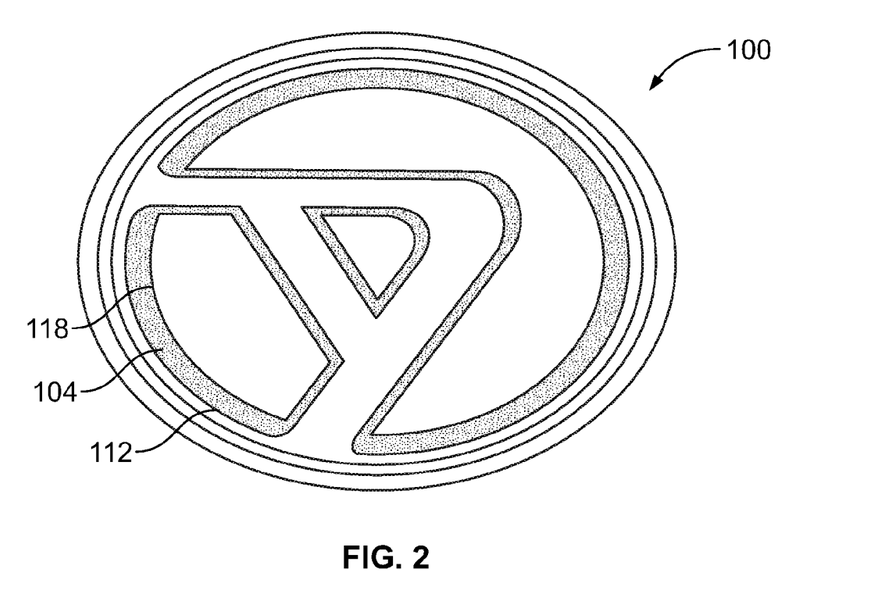
FIG. 2 is a front view of the light assembly in an illuminated state and a dark ambient lighting condition.

FIG. 2 is a front view of the light assembly 100 in an illuminated state and a dark ambient lighting condition. The light guide 104 is shaded in FIG. 2, and the shading represents illuminated portions of the light assembly 100. In dark ambient lighting, the shaded portions of the light guide 104 are the only portions of the light assembly 100 that would be visible. For example, the structural body 110 (shown in FIG. 1) of the emblem 102 (FIG. 1) may be opaque, such that light emitted from the light guide 104 is not visible (for example, does not get transmitted) through the emblem 102. The illuminated light guide 104 provides a lighting effect along the emblem edges 112 that outline the shape of the emblem 102. Thus, the emblem 102 is identifiable and perceivable in dark ambient lighting conditions. The exposed or visible areas of the illuminated light guide 104 have a width that extends from the emblem edges 112 of the emblem 102 to the exposed edges 118 of the light guide 104. In an embodiment, the light emitted from the light guide 104 proximate to the exposed edges 118 illuminates a substantial entirety of the emblem edges 112. As described below, the lighting effect shown in FIG. 2 is accomplished by directing light through the light guide 104 from only one or a few light sources 108 (shown in FIG. 3). Thus, the illuminated emblem lighting effect is not achieved by positioning a vast number of light sources in sequence around the emblem edges 112 of the emblem 102, unlike some known lighting assemblies for illuminating emblems.

Figure 3:
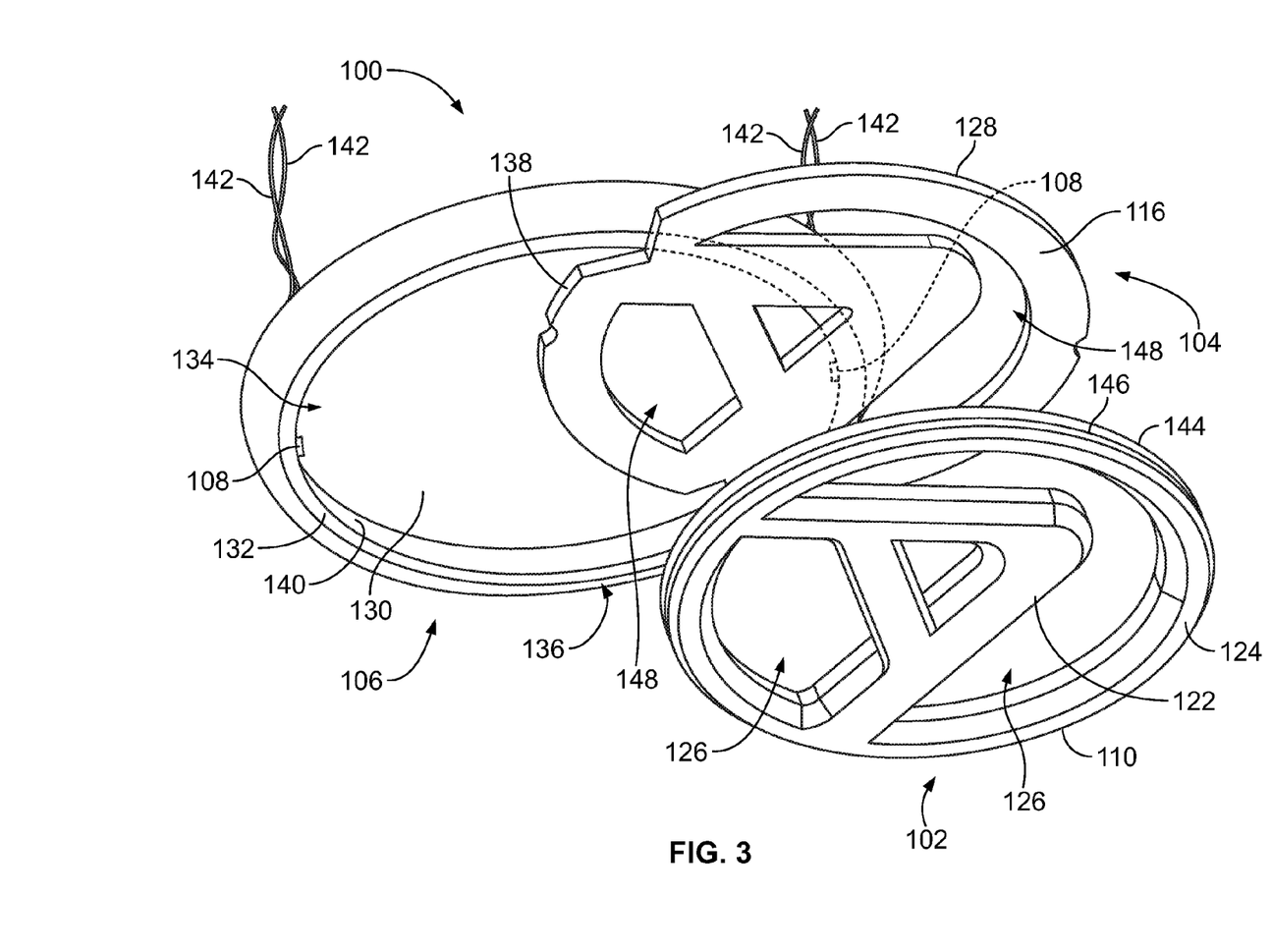
FIG. 3 is an exploded view of the light assembly.

FIG. 3 is an exploded view of the embodiment of the light assembly 100 shown in FIG. 1. The light guide 104 is disposed between the emblem 102 and the housing 106. The light assembly 100 may be configured to be reproducibly assembled and disassembled, such as to replace individual components of the light assembly 100.

The structural body 110 of the emblem 102 includes an inner emblem feature 122 and an outer emblem feature 124 that at least partially surrounds the inner emblem feature 122. The inner and outer emblem features 122, 124 may be integrally formed as a unitary component. The structural body 110 defines gaps or spaces 126 between the inner emblem feature 122 and the outer emblem feature 124. In an alternative embodiment, the structural body 110 of the emblem 102 does not include both inner and outer features, such as the emblem 202 shown in FIG. 8.

The structural body 110 of the emblem 102 may be formed of a plastic and/or metal material. The structural body 110 may be formed by a molding process, a stamping and forming process, an extrusion process, or another manufacturing process. As described above, the structural body 110 may be opaque such that light does not readily get transmitted through the structural body 110. Optionally, the structural body 110 may include a reflective surface, such as a chrome finish or a mirroring layer applied to the surface.

In an embodiment, the surface 116 of the light guide 104 that faces and is partially covered by the structural body 110 of the emblem 102 is a front surface 116 of the light guide 104. The light guide 104 also includes a rear surface 128 opposite the front surface 116. As used herein, relative or spatial terms such as "top," "bottom," "front," "rear," "left," and "right" are only used to distinguish the referenced elements and do not necessarily require particular positions or orientations in the light assembly 100 or in the surrounding environment of the light assembly 100. In one embodiment, the light guide 104 is relatively flat and planar. Alternatively, the light guide 104 may have rounded surfaces 116, 128. The light guide 104 may be disc-shaped with cutout interior portions in order for the shape of the light guide 104 to match the shape of the emblem 102.

The light guide 104 is composed of one or more light transmissive materials, such as glass or acrylic. For example, the light guide 104 may be formed of one or more polymers such as poly(methyl methacrylate) (PMMA) resin (also referred to as acrylic), polycarbonate, a perfluorinated polymer, or the like. The light guide 104 may be clear and transparent, or at least translucent, to allow the transmission of light through the interior region 114 (shown in FIG. 5). The light guide 104 may be formed by a molding process, a stamping and forming process, an extrusion process, or the like.

In an embodiment, the housing 106 includes a base 130 and a frame 132 extending from the base 130. The frame 132 defines a perimeter of a cavity 134. The base 130 defines a rear surface of the cavity 134. The cavity 134 is open at a front 136 of the housing 106. One or more light sources 108 are mounted to the frame 132 and face the cavity 134. In FIG. 3, two light sources 108 are mounted to the frame 132, but the light assembly 100 may have one or more than two light sources in other embodiments. The light sources 108 may extend at least partially into the cavity 134. The light sources 108 may be mounted on an inner wall 140 of the frame 132 that defines the cavity 134, or the light sources 108 may extend through an opening in the inner wall 140 of the frame 132. The cavity 134 is configured to receive the light guide 104 therein. For example, exterior edges 138 of the light guide 104 along a perimeter of the light guide 104 may engage the inner wall 140 of the frame 132. The engagement between the exterior edges 138 and the inner wall 140 may couple the light guide 104 to the housing 106, such as if the inner wall 140 includes a lip, a tab, or another feature that locks the light guide 104 in the cavity 134. In an embodiment, the light guide 104 receives light emitted from the light sources 108 that are mounted to the frame 132 through a corresponding exterior edge 138 of the light guide 104 that is proximate to each light source 108.

The light sources 108 of the light assembly 100 may be light emitting diodes (LED). One or more of the light sources 108 may be a tri-color red green blue (RGB) LED that is configured to be able to emit red light, green light, blue light, and/or combinations thereof to create many different colors and shades of light. Alternatively, one or more light sources 108 may be a monochromatic LED light that emits monochromatic white light. In alternative embodiments, one or more of the light sources 108 may be an incandescent bulb, a compact fluorescent lamp (CFL) bulb, or the like, instead of an LED. Although not shown, the light sources 108 may be operatively coupled to a light engine. The light engine includes drivers, controllers, and/or associated circuitry for controlling the optical characteristics of the light generated by the light sources 108. At least some of the drivers, controllers, and/or associated circuitry may be embedded or otherwise contained on a printed circuit board (PCB). The light sources 108 (and the light engine) receive power and/or information via electrical wires 142.

The housing 106 may be formed of one or more dielectric (meaning electrically insulative) materials to provide electrical insulation for the one or more light sources 108 and other associated electrical components, such as the light engine. The housing 106 may be formed by a molding process. In an embodiment, the housing 106, like the emblem 102, is opaque.

During assembly, the light guide 104 is received in the cavity 134 of the housing 106. For example, the rear surface 128 of the light guide 104 may abut, or at least face, the base 130 of the housing 106. The emblem 102 is received in the cavity 134 over the light guide 104. For example, the front surface 116 of the light guide 104 abuts, or at least faces, a rear side 144 of the structural body 110 of the emblem 102. An exterior surface 146 of the emblem 102 may engage the inner wall 140 of the frame 132 to couple the emblem 102 to the housing 106. When the emblem 102 is loaded into the cavity 134, the light guide 104 may be stacked between the base 130 of the housing 106 and the emblem 102. The base 130 of the housing 106 may be exposed in one or more of the spaces 126 defined between the inner emblem feature 122 and the outer emblem feature 124 of the emblem 102, as similar spaces 148 that are associated with the emblem spaces 126 may be defined in the light guide 104. In an alternative embodiment, the housing 106 may not include both a frame 132 and a base 130. For example, the housing 106 may only include the base 130, and the emblem 102 and/or light guide 104 may be coupled directly to the base 130. In another example, the housing 106 may only include the frame 132, such that no base or other part of the housing 106 is visible through the spaces 126, 148 in the emblem 102 and light guide 104, respectively.

Figure 4:
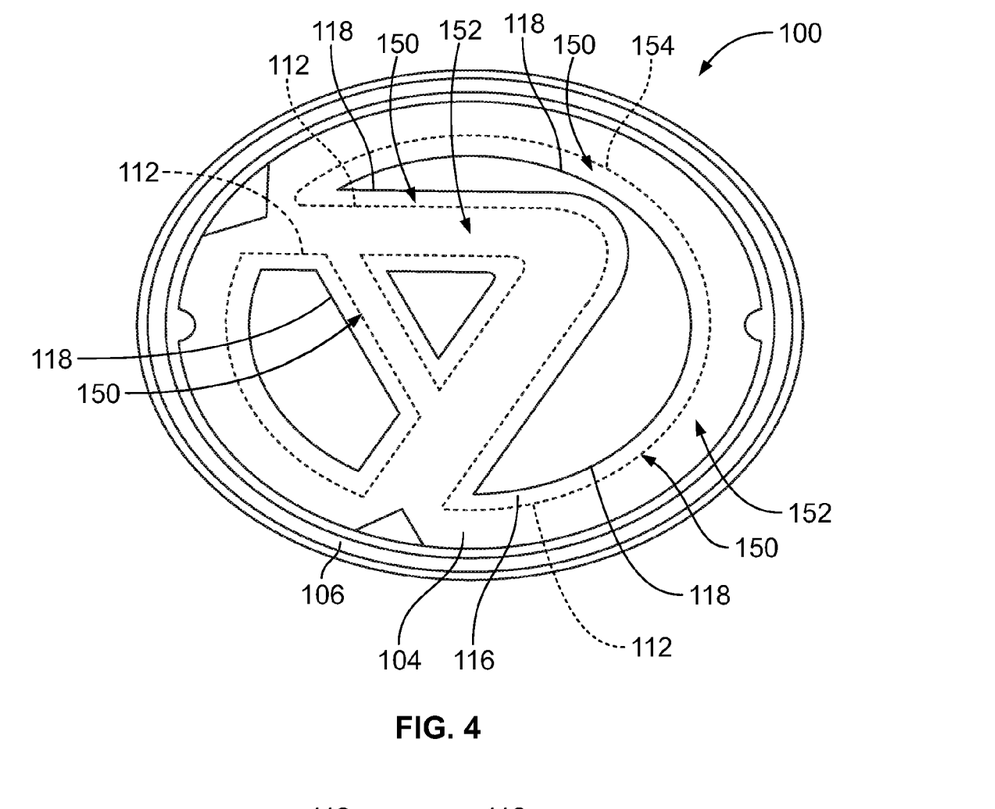
FIG. 4 is a front view of a partially assembled light assembly lacking an emblem.

FIG. 4 is a front view of a partially assembled light assembly 100 lacking the emblem 102 (shown in FIG. 3). The light assembly 100 includes the light guide 104 coupled to the housing 106. An outline of the structural body 110 (shown in FIG. 3) of the emblem 102 is illustrated in phantom in FIG. 4. For example, the phantom lines represent at least some of the emblem edges 112 of the structural body 110.

The area of the light guide 104 between the emblem edges 112 of the emblem 102 (shown in FIG. 3) and the exposed edges 118 of the light guide 104 defines an exposed region 150 of the light guide 104. Light emitted from the front surface 116 of the light guide 104 along one or more exposed regions 150 illuminates the shape of the emblem 102. In the illustrated embodiment, the exposed edges 118 of the light guide 104 extend along all of the emblem edges 112 of the inner emblem feature 122 (shown in FIG. 3) of the emblem 102, such that the light guide 104 projects laterally beyond both left and right sides of the inner emblem feature 122. Thus, the exposed regions 150 of the light guide 104 surround the inner emblem feature 122 on both left and right sides, and the light emitted from the exposed regions 150 illuminates all of the emblem edges 112 of the inner emblem feature 122. In addition, the exposed edges 118 extend along an interior emblem edge 154 of the outer emblem feature 124 (shown in FIG. 3). Thus, the light emitted from the exposed region 150 in this area illuminates the interior emblem edge 154 of the outer emblem feature 124.

In an embodiment, the exposed regions 150 of the light guide 104 comprise a minority of the surface area of the light guide 104 along the front surface 116. For example, most of the surface area of the front surface 116 is covered by the structural body 110 of the emblem 102. The area that is covered by the structural body 110 defines a covered region 152 of the light guide 104. The covered region 152 is laterally interior of the exposed edges 118 (and the exposed regions 150).

Optionally, the light guide 104 may have a reflective layer (not shown) that is disposed on the front surface 116 along the covered regions 152. Thus, the reflective layer may be disposed between the light guide 104 and the structural body 110 (shown in FIG. 3) of the emblem 102 (FIG. 3). The reflective layer is configured to reflect light that impinges thereon back into the interior region 114 (shown in FIG. 5) of the light guide 104 to prohibit the light from being emitted from the light guide 104 along the covered regions 152. The reflective layer is not located along the exposed regions 150 of the light guide 104. The reflective layer may be a reflective tape, a reflective paint, or the like, that is applied on the front surface 116. Alternatively, the reflective layer may be disposed at least partially within the interior region 114 under the front surface 116, and the reflective layer may be applied during a molding process that forms the light guide 104. The reflective layer prohibits the amount of light that emitted from the light guide 104 at undesirable locations, such as along the covered regions 152, where the light would be absorbed by the structural body 110 of the emblem 102. Optionally, a reflective layer may be applied to the rear surface 128 (shown in FIG. 3) of the light guide 104 to prohibit light emission rearwards towards the housing 106.

Figure 5:
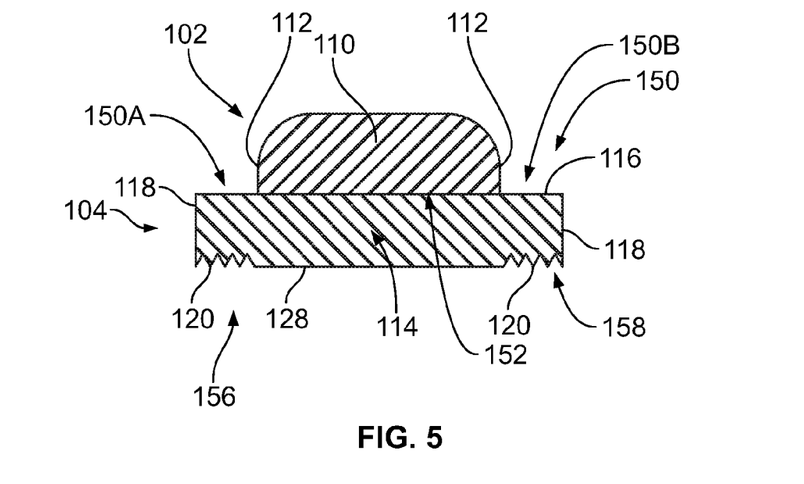
FIG. 5 is a side cross-sectional view of a segment of a structural body of the emblem on an optical light guide.

FIG. 5 is a side cross-sectional view of a segment of the structural body 110 of the emblem 102 on the light guide 104. The structural body 110 illustrated in FIG. 5 may be a segment of the inner emblem feature 122 (shown in FIG. 3) of the emblem 102, since the light guide 104 has exposed edges 118 on both sides of the structural body 110. Thus, the light guide 104 in FIG. 5 defines a left exposed region 150A and a right exposed region 150B.

The light guide 104 has light scattering elements 120 at least proximate to the exposed edges 118. The light scattering elements 120 are configured to deflect at least some of the light being transmitted through the interior region 114 of the light guide 104 such that light is emitted from the light guide 104 proximate to the exposed edges 118. For example, the light scattering elements 120 are configured to deflect the light such that light is emitted from the light guide 104 through the front surface 116 along the exposed regions 150. The light emitted from the exposed regions 150 illuminates the local emblem edges 112 of the emblem 102.

In an embodiment, the light scattering elements 120 are located at the rear surface 128 of the light guide. The light scattering elements 120 are irregular surfaces configured to deflect light that impinges thereon in various directions, such as towards the front surface 116 for emission through the front surface 116. For example, the light scattering elements 120 may deflect the light such that some of the light rays impinge upon the front surface 116 at an incident angle less than the critical angle. The light rays with incident angles less than the critical angle refract through the interface between the light guide 104 and the outside air (and are emitted from the light guide 104) instead of being reflected back into the interior region 114 of the light guide 104 via internal reflection. Thus, the light scattering elements 120 are configured to reduce the incident angles of at least some of the light rays within the interior region 114 that impinge upon the front surface 116, relative to the light guide 104 not having the light scattering elements 120, to increase the amount of light rays that are refracted through the front surface 116 of the light guide 104. In an alternative embodiment, the light scattering elements 120 are disposed within the interior region 114 of the light guide 104 instead of being at the rear surface 128.

The light scattering elements 120 may be aligned with the exposed regions 150 of the light guide 104. For example, as shown in FIG. 5, the light scattering elements 120 are laterally aligned with the two exposed regions 150A, 150B, such that a left set 156 of light scattering elements 120 is aligned with the left exposed region 150A, and a right set 158 of light scattering elements 120 is aligned with the right exposed region 150B. The sets 156, 158 of light scattering elements 120 are aligned with the exposed regions 150A, 150B in order to direct the deflected light towards the respective exposed regions 150A, 150B. For example, the light scattering elements 120 may not be laterally aligned with the covered region 152 of the light guide 104 because such light scattering elements may increase the amount of light that is emitted from the light guide 104 along the covered region 152, where such light would be absorbed by the structural body 110 of the emblem 102 without illuminating the emblem 102.

In an embodiment, the light scattering elements 120 are etched areas of the light guide 104. For example, the light scattering elements 120 may be etched into the rear surface 128 of the light guide 104 using a machine that roughs up the surface 128. The machine may be a laser machine that uses a laser to roughen the surface 128, producing laser-etched light scattering elements 120. Alternatively, rear surface 128 of the light guide 104 may be etched by filing or scraping the surface 128 to create the light scattering elements 120. By etching the light guide 104, the light scattering elements 120 are formed in the light guide 104 and are integral to the light guide 104. As a result, when the light guide 104 is not illuminated, such as during the daytime, the light scattering elements 120 are not visible to an observer, which may be desirable. In one or more alternative embodiments, the light scattering elements 120 may include a paint, a serrated object, or the like, that is applied to the rear surface 128 of the light guide 104 to provide the irregular surfaces that deflect light towards the front surface 116.

Figure 6:
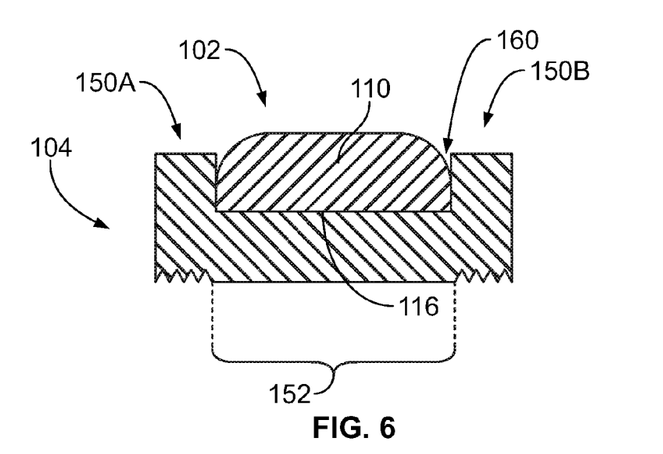
FIG. 6 is a side cross-sectional view of the segment of the structural body of the emblem on the optical light guide according to an alternative embodiment.

FIG. 6 is a side cross-sectional view of the segment of the structural body 110 of the emblem 102 on the light guide 104 that is shown in FIG. 5 according to an alternative embodiment. In the embodiment shown in FIG. 5, the light guide 104 has a generally uniform thickness across a width of the light guide 104. In the embodiment shown in FIG. 6, however, the thickness of the light guide 104 is not uniform.

For example, the exposed regions 150A, 150B of the light guide 104 have a greater thickness than the covered region 152. The exposed regions 150A, 150B project beyond the surface of the covered region 152 along the front surface 116 of the light guide 104. Since the exposed regions 150A, 150B step up from the covered region 152, a groove 160 is defined laterally between the exposed regions 150A, 150B and vertically above the covered region 152. The groove 160 receives the structural body 110 of the emblem 102 therein. The groove 160 may simplify the assembly process by providing an alignment aid that properly aligns the structural body 110 relative to the light guide 104.

Figure 7:
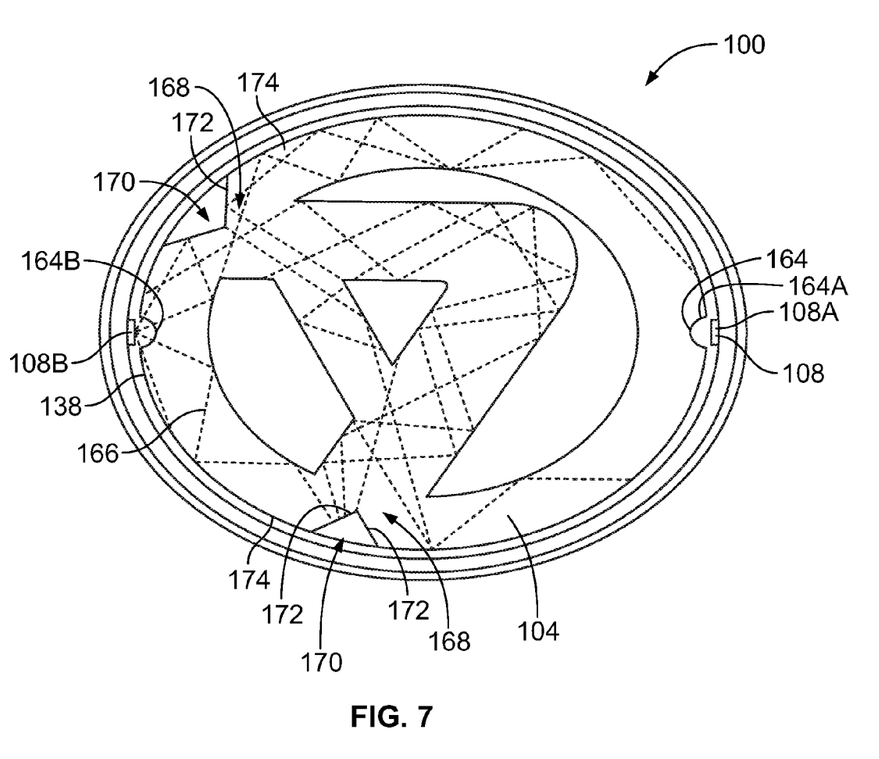
FIG. 7 is a front view of a partially assembled light assembly that shows a tracing analysis of light reflection within the optical light guide.

FIG. 7 is a front view of a partially assembled light assembly 100 that shows a tracing analysis of light reflection within the light guide 104. The light assembly 100 in FIG. 7 lacks the emblem 102 (shown in FIG. 3). In the illustrated embodiment, the light assembly 100 includes two light sources 108 (for example, a left light source 108A and a right light source 108B) located on opposite sides of the light assembly 100. The tracing analysis may represent light that is generated by only the right light source 108B to better show the paths that light from a single light source may take, although both light sources 108A, 108B may emit light simultaneously during use of the light assembly 100. The light from the right light sources 108B is represented by lines 166. The light guide 104 may be configured to receive the light from each light source 108A, 108B through the exterior edge 138 of the light guide 104 along the perimeter of the light guide 104.

In an embodiment, the light guide 104 includes at least one light spreading feature 164 configured to distribute or spread light that impinges upon the light spreading feature 164. In the illustrated embodiment, the light spreading features 164 have concave shapes and are defined along the exterior edge 138, such that the light spreading features 164 are concave cut-out portions along the edge 138 of the light guide 104. Each light spreading feature 164 may be aligned with and optically coupled to a corresponding light source 108. Thus, the light guide 104 in the illustrated embodiment includes two light spreading features 164A, 164B that each align with one of the light sources 108A, 108B. The phrase "optically coupled" is used to mean that each light spreading feature 164 is located proximate to the corresponding light source 108 such that a substantial portion of the light emitted by the light source 108 is received by the light spreading feature 164. The optically-coupled light source 108 and light spreading feature 164 may mechanically engage one another, or may be proximate to one another without mechanical engagement therebetween. As shown in FIG. 7, the light spreading feature 164 is a cutout portion of the light guide 104 in a concave shape that at least partially surrounds the corresponding light source 108.

The light spreading feature 164 is configured to receive the light emitted from the corresponding light source 108 such that at least some of the light refracts through the light spreading feature 164 to enter the interior region 114 (shown in FIG. 5) of the light guide 104. The light spreading feature 164 is also configured to spread or distribute the light such that the light is refracted into the interior region 114 in a wider array or distribution pattern than the external array of light that impinges upon the light spreading feature 164 from the light source 108. The concave shape of the light spreading feature 164 bends the light in a wide array of directions in order for the light to better propagate through an entirety of the light guide 104. As a result, substantially all of the exposed regions 150 (shown in FIG. 4) of the light guide 104 receive light to illuminate the emblem edges 112 (shown in FIG. 3) of the emblem 102 (FIG. 3). The illumination of the emblem 102 is accomplished using only a limited number of light sources 108 (such as one or two). The light spreading features 164 are optional.

In the illustrated embodiment, the light guide 104 includes at least one branching location 168 where a single segment of the light guide 104 splits into at least two segments. In order to distribute light coming from the single segment into both of the two branching segments, the light guide 104 may define reflection features 170 disposed proximate to one or more branching locations 168. The reflection feature 170 has one or more reflecting surfaces 172 that are configured to reflect light that impinges thereon into a branching segment. The reflection feature 170 may have two reflecting surfaces 172 arranged in a wedge or V-shape. The reflection feature 170 in an embodiment is a cutout portion of the light guide 104 located along a non-exposed edge 174 of the light guide 104. The non-exposed edge 174 is an edge that is covered by the structural body 110 (shown in FIG. 3) of the emblem 102 (FIG. 3) and does not project laterally beyond the corresponding emblem edge 112 (FIG. 3). In alternative embodiment, the reflection feature 170 may be a cutout portion located laterally interior of and wholly surrounded by the edges of the light guide 104. In another alternative embodiment, the reflection feature 170 may be a reflective layer or molded component that is disposed within the interior region 114 (shown in FIG. 5) of the light guide 104, instead of being a cutout portion of the light guide 104. It is recognized that the reflection features 170 are optional.

Figure 8:
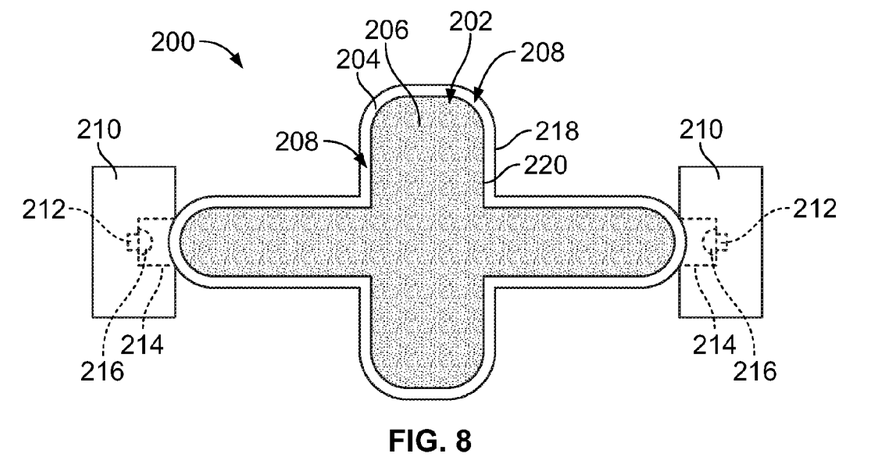
FIG. 8 is front view of a light assembly according to an alternative embodiment.
Figure 9:
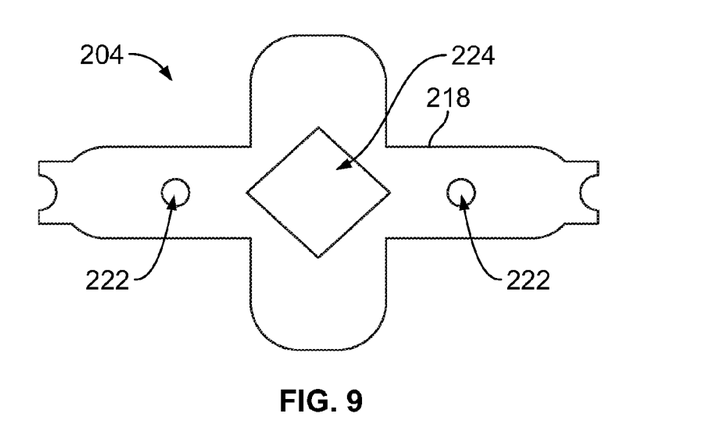
FIG. 9 is a front view of an optical light guide of the light assembly shown in FIG. 8.

FIG. 8 is front view of a light assembly 200 according to an alternative embodiment. The light assembly 200 includes an emblem 202 and an optical light guide 204 (referred to as light guide 204). FIG. 9 is a front view of the light guide 204 of the light assembly 200. The components and functionality of the light assembly 200 may be similar to those of the light assembly 100 shown and described with reference to FIGS. 1-7, except as enumerated below.

The emblem 202 has a structural body 206 that includes only a single, unitary feature, which is shown as a rounded cross or plus-sign shape. Thus, the emblem 202 does not include an inner emblem feature and an outer emblem feature, unlike the emblem 102 (shown in FIG. 3). The shape of the light guide 204 matches the shape of the emblem 202, and exposed regions 208 of the light guide 204 project laterally beyond the structural body 206 of the emblem 202. Instead of a housing that forms a backing structure for the light assembly 200, the housing of the light assembly 200 includes at least one bracket 210. For example, in the illustrated embodiment the light assembly 200 includes two brackets 210, with one bracket 210 disposed on each side of the assembly 200. Each bracket 210 is used to mount the light assembly 200 to a structure, such as a hood or grill of an automobile. The brackets 210 may each hold a light source 212, shown as hidden lines in FIG. 8 because the light source 212 may be rearward of a panel of the respective bracket 210. In an embodiment, the light guide 204 has projections 214 that extend into the brackets 210 to couple the light guide 204 to the brackets 210. The projections 214 are also shown as hidden lines in FIG. 8. The projections 214 each include a light spreading feature 216 that is optically coupled to the light source 212 mounted in the corresponding bracket 210. The brackets 210 in the illustrated embodiment have a curved interior surface that at least partially defines the shape of the emblem 202 to absorb light that is emitted from the projections 214 of the light guide 204.

Since there is no outer emblem feature in the illustrated embodiment, the exposed edges 218 of the light guide 204 may surround an entirety of the emblem edges 220 of the emblem 202. In an embodiment, the structural body 206 of the emblem 202 is mounted (for example, coupled) directly to the light guide 204, instead of being coupled to or extending from a housing. As shown in FIG. 9, the light guide 204 may define at least one mounting hole 222 for receiving a fastener (not shown) that holds the emblem 202 to the light guide 204. In another embodiment, the light guide 204 may be mounted to the light guide 204 via an adhesive, an epoxy or glue, or the like. Furthermore, the light guide 204 may optionally include a reflection feature 224 for reflecting and directing light throughout the light guide 204. The reflection feature 224 may be a cutout portion of the light guide 204 that is wholly interior of the edges 218 of the light guide 204.

At least one technical effect of the various embodiments described herein is providing an illuminated emblem that is aesthetically pleasing and attention-drawing. Another technical effect is to provide an illuminated emblem using only one or a few light sources. The illuminated emblem may be provided using only a limited number of components and circuitry to conserve space. A further technical effect is to provide an illuminated emblem with a limited number of light sources which limits an amount of heat generated, limits an amount of power consumed, and extends an operative lifetime of the light sources.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A light assembly for illuminating an emblem, the light assembly comprising:
a housing that holds at least one light source configured to generate light;
an emblem having a structural body defined by emblem edges; and
an optical light guide coupled to the housing, the optical light guide having a front surface facing and partially covered by the structural body of the emblem, the optical light guide having a shape defined by exposed edges of the optical light guide that extend from the front surface, the shape of the optical light guide matching a shape of the emblem and being larger than the shape of the emblem such that the exposed edges of the optical light guide project laterally beyond the emblem edges of the emblem to define an exposed region of the front surface between the emblem edges and the exposed edges, the optical light guide configured to receive light generated by the at least one light source and to emit at least some of the light along the exposed region to illuminate the emblem edges.

2. The light assembly of claim 1, wherein the housing includes a frame extending from a base of the housing, the frame defining a perimeter of a cavity, the at least one light source being mounted to the frame and facing the cavity, the optical light guide being received in the cavity and being configured to receive light generated by the at least one light source through an exterior edge of the optical light guide along a perimeter of the optical light guide.

3. The light assembly of claim 1, wherein the optical light guide receives the light from the at least one light source through an exterior edge of the optical light guide along a perimeter of the optical light guide, the optical light guide including at least one light spreading feature defined along the exterior edge, each light spreading feature aligned with and optically coupled to a corresponding light source such that light from the light source refracts through the light spreading feature to be received in the optical light guide.

4. The light assembly of claim 1, wherein the optical light guide includes at least one branching location where a single segment of the optical light guide splits into at least two segments, the optical light guide defining a reflection feature proximate to a corresponding branching location, the reflection feature configured to reflect light transmitted through the single segment into the at least two segments that extend therefrom at the branching location.

5. The light assembly of claim 1, wherein the structural body of the emblem is opaque.

6. The light assembly of claim 1, wherein the structural body of the emblem covers a covered region of the optical light guide that is interior of the exposed region of the optical light guide, the optical light guide having a reflective layer disposed on the front surface along the covered region, the reflective layer configured to reflect light that impinges thereon back into the optical light guide to prohibit the light from being emitted from the optical light guide along the covered region.

7. The light assembly of claim 1, wherein the exposed region comprises a minority of a surface area of the front surface of the optical light guide.

8. The light assembly of claim 1, wherein the structural body of the emblem covers a covered region of the optical light guide, the exposed region of the optical light guide extending along a perimeter of the covered region, the optical light guide having a greater thickness along the exposed region than along the covered region, the exposed region projecting beyond the covered region along the front surface to at least partially define a groove that receives the structural body of the emblem therein.

9. The light assembly of claim 1, wherein the structural body of the emblem includes an inner emblem feature and an outer emblem feature that at least partially surrounds the inner emblem feature, the inner emblem feature having first and second emblem edges, the outer emblem feature having interior and exterior emblem edges, the exposed region of the optical light guide projecting beyond both the first and second emblem edges of the inner emblem feature and the interior emblem edge of the outer emblem feature, the light emitted along the exposed region of the front surface of the optical light guide illuminating both the first and second emblem edges of the inner emblem feature and the interior emblem edge of the outer emblem feature.

10. The light assembly of claim 1, wherein the structural body of the emblem includes an inner emblem feature and an outer emblem feature that at least partially surrounds the inner emblem feature, the emblem defining one or more spaces between the inner emblem feature and the outer emblem feature.

11. The light assembly of claim 1, wherein the optical light guide includes light scattering elements proximate to the exposed edges of the optical light guide, the light scattering elements configured to reflect and scatter at least some of the light in the optical light guide.

12. The light assembly of claim 11, wherein the optical light guide has a rear surface that is opposite to the front surface, the light scattering elements being located along the rear surface of the optical light guide and being configured to reflect light towards the front surface for emission of the light through the front surface along the exposed region.

13. The light assembly of claim 12, wherein the light scattering elements are at least one of etched areas of the optical light guide, a paint applied to the rear surface of the optical light guide, or a serrated object applied to the rear surface of the optical light guide.

14. The light assembly of claim 1, wherein the exposed edges of the optical light guide extend parallel to adjacent emblem edges of the emblem.

15. The light assembly of claim 1, wherein the emblem represents an emblem of an automotive manufacturer.

16. A light assembly for illuminating an emblem, the light assembly comprising:
    an emblem having a structural body defined by emblem edges; and
    an optical light guide coupled to the emblem, the optical light guide being configured to receive light generated by at least one light source and to transmit the light through the optical light guide, the optical light guide having a shape associated with the emblem, the optical light guide having a front surface facing and at least partially covered by the structural body of the emblem, the optical light guide defining exposed edges that project laterally beyond the emblem edges of the emblem,
    wherein an exposed region of the optical light guide is defined between the exposed edges and the emblem edges of the emblem, the optical light guide having light scattering elements located along the exposed region, the light scattering elements being configured to reflect at least some of the light being transmitted through the optical light guide to emit light from the optical light guide along the exposed region and illuminate the emblem edges of the emblem.

17. The light assembly of claim 16, wherein the light scattering elements are etched areas of the optical light guide.

18. The light assembly of claim 16, wherein the optical light guide receives the light from the at least one light source through an exterior edge of the optical light guide along a perimeter of the optical light guide, the optical light guide including at least one light spreading feature defined along the exterior edge, each light spreading feature aligned with and optically coupled to a corresponding light source such that light from the light source refracts through the light spreading feature to enter the optical light guide.

19. The light assembly of claim 16, wherein the structural body of the emblem covers a covered region of the optical light guide that is adjacent to the exposed region of the optical light guide, the optical light guide having a reflective layer disposed on the front surface along the covered region, the reflective layer configured to reflect light that impinges thereon back into optical light guide to prohibit the light from being emitted from the front surface along the covered region.

20. A light assembly for illuminating an emblem, the light assembly comprising:
- a housing that holds at least one light source configured to generate light;
- an emblem having a structural body defined by emblem edges; and
- an optical light guide coupled to the housing, the optical light guide having a front surface facing and partially covered by the structural body of the emblem, the optical light guide having an exterior edge that extends from the front surface and defines a perimeter of the optical light guide, the optical light guide further including at least one light spreading feature along the exterior edge, each light spreading feature aligning with and optically coupling to a corresponding light source, the optical light guide also including exposed edges located interior of the exterior edges, the exposed edges projecting laterally beyond the emblem edges of the emblem to define an exposed region of the front surface, wherein the optical light guide is configured receive light from the at least one light source into the optical light guide through the at least one light spring feature along the exterior edge, and the optical light guide is configured to emit at least some of the light through the front surface along the exposed region to illuminate the emblem edges.

\* \* \* \* \*